A. S. SPIEGEL.
PROCESS AND APPARATUS FOR MAKING COMPOSITE PICTURE SLIDES AND THE LIKE.
APPLICATION FILED NOV. 20, 1911. RENEWED JAN. 22, 1913.
1,066,766.
Patented July 8, 1913.
2 SHEETS—SHEET 1.
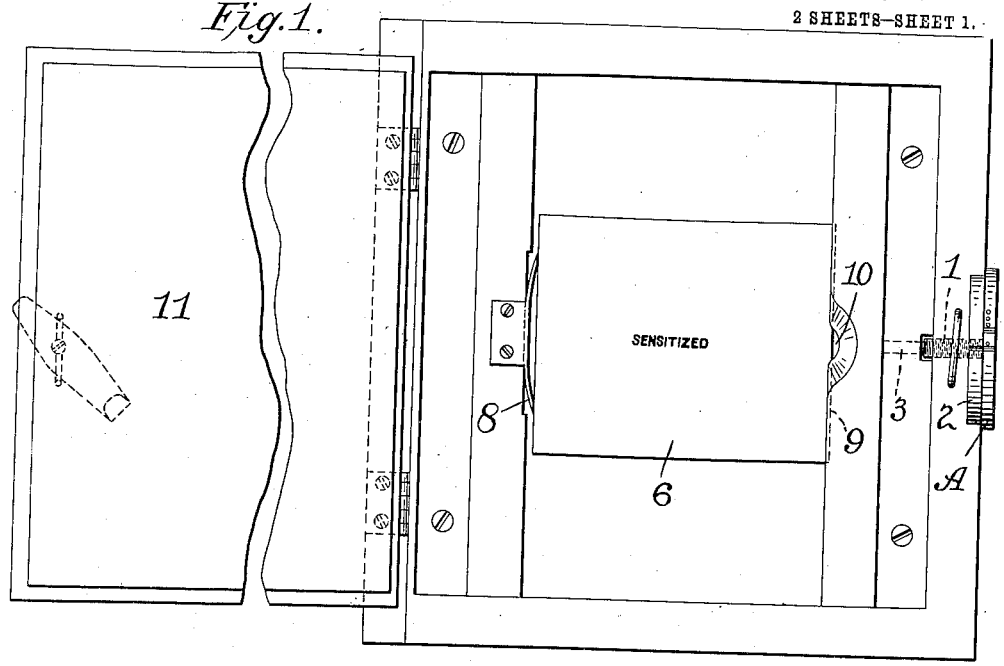
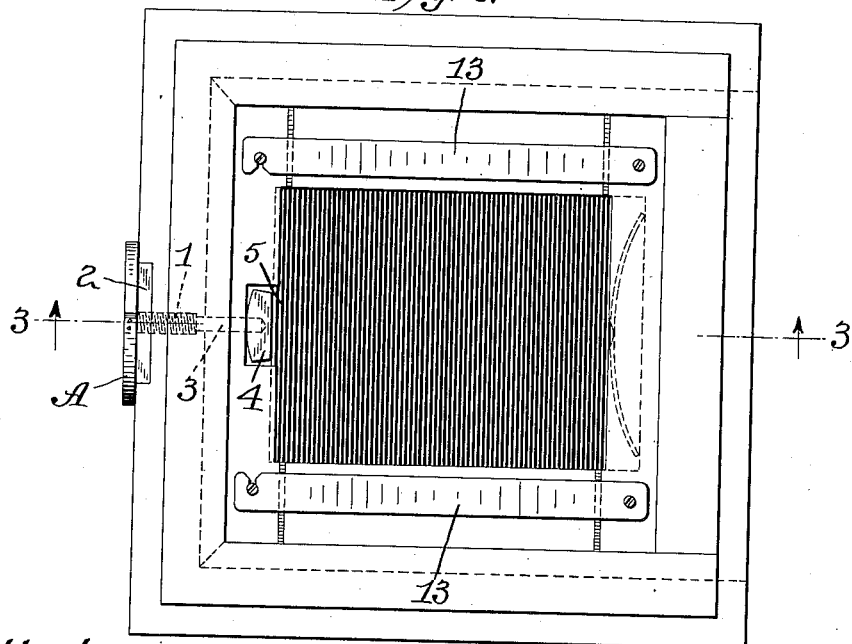

A. S. SPIEGEL.
PROCESS AND APPARATUS FOR MAKING COMPOSITE PICTURE SLIDES AND THE LIKE.
APPLICATION FILED NOV. 20, 1911. RENEWED JAN. 22, 1913.
1,066,766.
Patented July 8, 1913.
2 SHEETS—SHEET 2.
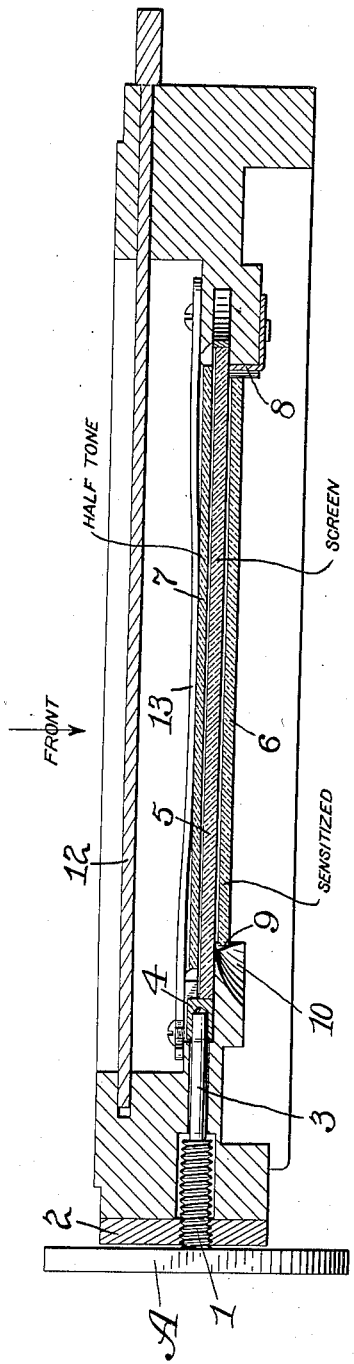
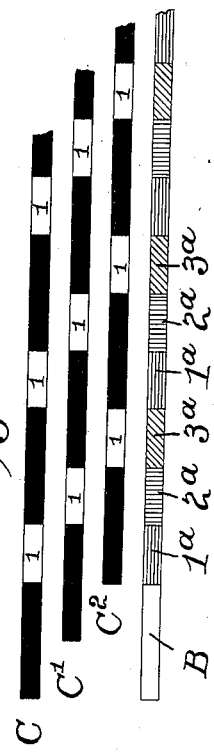
Attest:
Ewd L. Tolson
C. E. Parsons
Inventor:
Alexander S. Spiegel,
by Spear, Middleton, Donaldson & Spear
Attys.

UNITED STATES PATENT OFFICE.

ALEXANDER S. SPIEGEL, OF CHICAGO, ILLINOIS, ASSIGNOR OF TWO-THIRDS TO ROBERT GLENDINNING, OF CHICAGO, ILLINOIS.

PROCESS AND APPARATUS FOR MAKING COMPOSITE-PICTURE SLIDES AND THE LIKE.

1,066,766.   Specification of Letters Patent.   Patented July 8, 1913.

Application filed November 20, 1911, Serial No. 661,407. Renewed January 22, 1913. Serial No. 743,653.

*To all whom it may concern:*

Be it known that I, ALEXANDER S. SPIEGEL, citizen of the United States, residing at Chicago, Illinois, have invented certain new and useful Improvements in Processes and Apparatus for Making Composite-Picture Slides and the Like, of which the following is a specification.

The invention relates to means for producing the picture-carrying member of a lantern slide, postcard, sign, or the like, said picture carrying member being of a composite character and being designed to be used in connection with a screen member for producing motion picture effects.

In the accompanying drawings Figure 1 is a back view of the apparatus with the cover turned back; Fig. 2 is a view looking from the upper side of Fig. 3, with the screen plate in place; Fig. 3 is a sectional view substantially on the line 3—3 of Fig. 2, with the back cover omitted; Fig. 4 is a diagram illustrating the action of the apparatus or the screen member thereof in producing the picture effects.

The picture carrying member of the lantern slide is produced by means of a screen plate having lines thereon like the screen plate of the lantern slide. This screen is movably mounted in a frame, being pressed by a spring in one direction, and being adjusted by a disk A having a screw threaded stem 1, passing through a nut 2, the plain extension 3 of said stem entering a recess in a block 4 slidably mounted in the frame and pressing upon one edge of the screen member 5. The disk A is graduated so that by turning it to different points the screen plate is made to assume different predetermined positions, say three in number. The screen plate covers the sensitized plate 6. The idea is by adjusting the screen plate, to take off from the objective or member carrying the entire picture, certain sections of said picture through the spaces between the screen bars on to the sensitized plate. A half tone plate or screen is shown at 7, though this may be omitted. The sensitized plate is held in place by a spring 8, bearing upon one edge, the other edge at 9 fitting in a groove in the frame, 10 being a cut away portion of the frame to allow the finger to engage the edge of the plate 6 for its removal or placing. The frame is closed at its back by a door or cover 11.

It will be seen from the diagram of Fig. 4 that the composite picture is secured by exposing the sensitized plate while the screen is in one position, then making another exposure after the screen member 5 has been shifted to another position, and, if desired, making a third exposure after the screen has been shifted to a third position.

The screen member 5 is made up of a plate of glass or other transparent material having thereon opaque parallel lines, Fig. 2, with clear spaces in between these lines, through which clear spaces the surface of the sensitized plate may be exposed. In producing a composite picture suitable for giving moving picture effects, it will be understood that the person or figure to be photographed is posed in one position and the sensitized plate is exposed through the clear spaces of the screen member by withdrawing the slide 12 as in the use of an ordinary plate holder of a camera outfit. After this exposure, and after the slide 12 has been replaced, the screen member 5 is adjusted to cover the surface of the sensitized plate just exposed, and to bring the clear spaces of the screen opposite other adjacent portions of the sensitized plate, and after the person or figure has been posed in another position, a second exposure is made by withdrawing the slide 12, and this operation may be repeated any desired number of times within the limits for which the apparatus was designed. When the sensitized plate is developed, there will appear a composite picture made up of different groups of lines, one group representing one pose, another another pose of the same figure or object, and so on. Now when this composite picture carrying member is combined with a screen member composed of parallel opaque lines and transparent spaces, and one is shifted in relation to the other, the different groups of lines on the composite picture will appear in succession and as rapidly as desired through the clear spaces, and the moving picture effect will be produced.

In the diagram, Fig. 4, suppose B to represent the sensitized plate and C, C', C² the screen member in three different positions in relation to said plate. When the screen and sensitized plates are in the position C, withdrawal of the slide 12 will result in an exposure of the sensitized plate to the objective through the clear spaces 1, these exposed portions being indicated on the plate B by the horizontal lines at $1^a$, all the other portions of the sensitized plate, however, being covered or protected by the opaque lines of the screen. Now, by shifting the screen to the right in relation to the sensitized plate to the position C', exposure of the plate at the points $2^a$ will take place through the clear spaces 1, and the previously exposed portions of the sensitized plate at $1^a$, together with the remaining unexposed portions at $3^a$, will be covered and protected by the opaque lines of the screen. By shifting the screen member to the right in relation to the surface of the sensitized plate to the position shown at $C^2$, the portions $3^a$ of the plate will be exposed while the portions $1^a$ and $2^a$ will be covered. By thus taking a number of pictures of the same object or person, and changing the pose between exposures, a composite picture will be produced which, when used in combination with a screen like that described, for taking the pictures, the different sections of the composite picture will be brought to view in succession for securing the moving picture effects, and by using a transparent sensitized plate and a transparent screen member having the opaque and clear lines, a slide may be formed suitable for projecting the images on a screen by a lantern such as used in moving picture shows.

I do not limit myself to three different positions of the screen, nor to the details of construction or particular means of adjustment. The frame or box in its general characteristics is like that of a plate holder, but having the external means for adjusting the screen member within the box or holder.

The half tone plate is held in place by the clamp bars 13.

The screen may be composed of glass having the opaque lines thereon with the clear spaces between, or the screen may be otherwise formed to provide the opaque portions and clear spaces.

I claim as my invention:

1. The process of making composite picture members herein described, consisting in making successive exposures of a sensitized plate through a screen having opaque portions and clear spaces and shifting said screen after each exposure, to shield the exposed portions and to expose new portions, substantially as described.

2. In combination in an apparatus for making composite pictures, a holder for a sensitized plate, and a screen member made of a series of parallel opaque portions with clear spaces between, and means for adjusting the screen to different positions to expose different portions of the sensitized plate in succession, the portion first exposed being covered by the opaque lines when the screen is adjusted to expose a new portion, substantially as described.

3. In combination a holder for a sensitized plate, a screen plate made up of opaque portions and clear spaces between, means for adjusting the screen to expose different portions of the sensitized plate in succession, and a half tone plate on the same side of the sensitized plate as the adjustable screen, substantially as described.

4. In combination a holder for a sensitized plate, having a slide to open or close the same, a screen plate within the holder having opaque portions and clear spaces, and means accessible on the outer side of the holder for adjusting the screen plate to a plurality of predetermined positions to expose successively different portions of the sensitized plate while protecting all other portions, substantially as described.

In testimony whereof, I affix my signature in presence of two witnesses.

ALEXANDER S. SPIEGEL.

Witnesses:
WALTER DONALDSON,
BENNETT S. JONES.